United States Patent
Street et al.

(10) Patent No.: US 7,065,947 B1
(45) Date of Patent: Jun. 27, 2006

(54) POWERED ZRT SAND GROOMING VEHICLE AND GROOMING BRUSH RAKE

(75) Inventors: Benjamin A. Street, Northfield, MN (US); David J. Scherbring, Savage, MN (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 10/765,714

(22) Filed: Jan. 27, 2004

(51) Int. Cl.
*A01D 76/00* (2006.01)
*A01D 78/00* (2006.01)
*A01D 80/00* (2006.01)
*A01D 84/00* (2006.01)

(52) U.S. Cl. .............. 56/371; 172/29; 56/378
(58) Field of Classification Search .......... 56/6, 56/344, 372, 378, 380, 384, 16.4 R, 371, 56/370; 172/612, 29, 622, 199; D15/28; 15/78
See application file for complete search history.

(56) References Cited

U.S. PATENT DOCUMENTS

| | | | | |
|---|---|---|---|---|
| 1,421,060 A * | 6/1922 | Brook | ........ | 172/468 |
| 1,566,194 A * | 12/1925 | Freeman | ........ | 15/78 |
| 1,674,306 A * | 6/1928 | Shaw | ........ | 15/78 |
| 2,300,192 A * | 10/1942 | Allen | ........ | 15/78 |
| 3,086,236 A * | 4/1963 | Anonsen | ........ | 15/203 |
| 3,115,738 A * | 12/1963 | Engler | ........ | 56/6 |
| 3,400,521 A * | 9/1968 | Caldwell | ........ | 56/6 |
| 3,525,201 A * | 8/1970 | Kaufman | ........ | 56/7 |
| 4,135,349 A * | 1/1979 | Schwertner | ........ | 56/6 |
| 4,148,174 A * | 4/1979 | Mathews et al. | ........ | 56/12.7 |
| 4,370,846 A * | 2/1983 | Arnold | ........ | 56/6 |
| 4,747,174 A * | 5/1988 | Hightower | ........ | 15/78 |
| 4,989,676 A * | 2/1991 | Rogers | ........ | 172/438 |
| 5,018,587 A * | 5/1991 | Gandrud et al. | ........ | 172/612 |
| 5,133,174 A * | 7/1992 | Parsons, Jr. | ........ | 56/6 |
| 5,251,704 A * | 10/1993 | Bourgault et al. | ........ | 172/311 |
| 5,621,940 A * | 4/1997 | Lewis et al. | ........ | 15/78 |
| D395,900 S * | 7/1998 | Shannon et al. | ........ | D15/28 |
| 5,833,013 A * | 11/1998 | Davis | ........ | 172/612 |
| 5,911,625 A * | 6/1999 | von Allworden | ........ | 460/119 |
| 5,918,684 A * | 7/1999 | Tozer | ........ | 172/199 |
| 6,439,444 B1* | 8/2002 | Shields, II | ........ | 224/280 |

OTHER PUBLICATIONS

Toro Sand Pro Brochure, date 1998.
Smithco Brochure showing Super Rake Brush, undated but admitted prior art.

* cited by examiner

*Primary Examiner*—Árpád Fábián Kovács
(74) *Attorney, Agent, or Firm*—James W. Miller (57) ABSTRACT

A sand grooming vehicle comprises a vehicle having zero radius turn capability. The vehicle includes a front caster wheel, two independently driven rear wheels, and twin control sticks for allowing spin turning of the vehicle by driving the outboard drive wheel and stopping or reversing the inboard wheel. A trailing brush rake is towed behind the vehicle to groom the sand. The brush rake includes a center brush and two pivotal side brushes connected to opposite ends of the center brush. The pivots connecting the side brushes and the center brush are elevated above the plane of engagement of the bristles of the side brushes and the sand. Thus, during a spin turn of the vehicle, the side brush on the inside of the turn lifts to avoid pushing a ridge of sand behind that side brush. This permits the vehicle and the brush rake to groom the sand surface without leaving any ungroomed teardrops at the inside of turns and without leaving ridges of sand on the sand surface.

7 Claims, 7 Drawing Sheets

POWERED ZRT SAND GROOMING VEHICLE AND GROOMING BRUSH RAKE

TECHNICAL FIELD

This invention relates to a powered movable vehicle having a trailing towed rake that engages and smoothes a surface made of sand or the like and to a grooming brush rake that comprises the trailing towed rake.

BACKGROUND OF THE INVENTION

Small powered vehicles are known for grooming sand surfaces such as those found in the sand traps or bunkers of golf courses. These vehicles typically have three ground engaging wheels arranged in a tricycle configuration comprising a steerable front wheel and two rear wheels. An operator sits on a seat on the vehicle and drives and steers the vehicle using a steering wheel adjacent the seat. The steering wheel is operably connected to the steerable front wheel of the vehicle. The SAND PRO® brand of bunker rakes manufactured and sold by The Toro Company, the assignee of this invention, is a well known line of sand grooming vehicles of this type.

A trailing rake is towed behind sand grooming vehicles of this type to engage and smooth the sand. Traditionally, such rakes have a plurality of independently movable rake sections with each rake section having a plurality of rigid teeth. The rake teeth engage and groom the sand as the rake is pulled over the sand by the vehicle and the rake teeth pass through the sand. In some rakes, the rake teeth comprise spring teeth rather than rigid teeth for providing a smoother finish on the sand. In other rakes, brushes have been used as the rakes to provide an even firmer and smoother finish on the sand.

In grooming sand traps or the like, vehicles of this type typically have to turn around and make multiple side-by-side grooming passes over the trap to groom the entire trap. This is particularly true in modern golf courses where some sand traps can be quite large. However, when turning around, conventional vehicles and rakes of this type typically leave a teardrop shaped area of ungroomed sand on the inside corner of the turn. This is obviously a disadvantage as such ungroomed teardrops detract from the appearance of the sand in the groomed trap. It would be desirable to have a sand grooming vehicle and rake that could groom an entire sand trap without leaving any ungroomed teardrops.

Moreover, traditional sand grooming vehicles are not suited for use in very small bunkers and traps due to their turning radius. Such small bunkers and traps must be raked or groomed by hand. This is more laborious and time consuming than using a driven vehicle to groom the trap. Thus, it would also be desirable for a powered sand grooming vehicle to be suited for use in small bunkers and traps to avoid the need to hand groom such bunkers and traps.

SUMMARY OF THE INVENTION

One aspect of this invention relates to a brush rake for a grooming vehicle for smoothing loose granular material. The brush rake comprises a center brush having a hitch for connecting to the vehicle such that the center brush can be towed behind the vehicle. A pair of side brushes are pivotally connected to the center brush with a first side brush being pivotally connected to one lateral outer end of the center brush and a second side brush being pivotally connected to an opposite lateral outer end of the center brush.

Another aspect of this invention relates to a grooming vehicle for grooming a loose granular material surface. The vehicle has substantially zero radius turn capability. A trailing rake is towed behind the vehicle for grooming the loose granular material surface in a grooming swath.

Yet another aspect of this invention relates to a vehicle having a trailing brush rake towed behind the vehicle to groom a loose granular material surface. The vehicle has a front caster wheel, two independently driven rear wheels, and twin control sticks for independently driving the rear wheels for spin turning of the vehicle. The brush rake includes at least one brush for engaging and smoothing the loose granular material.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

Figure 1:
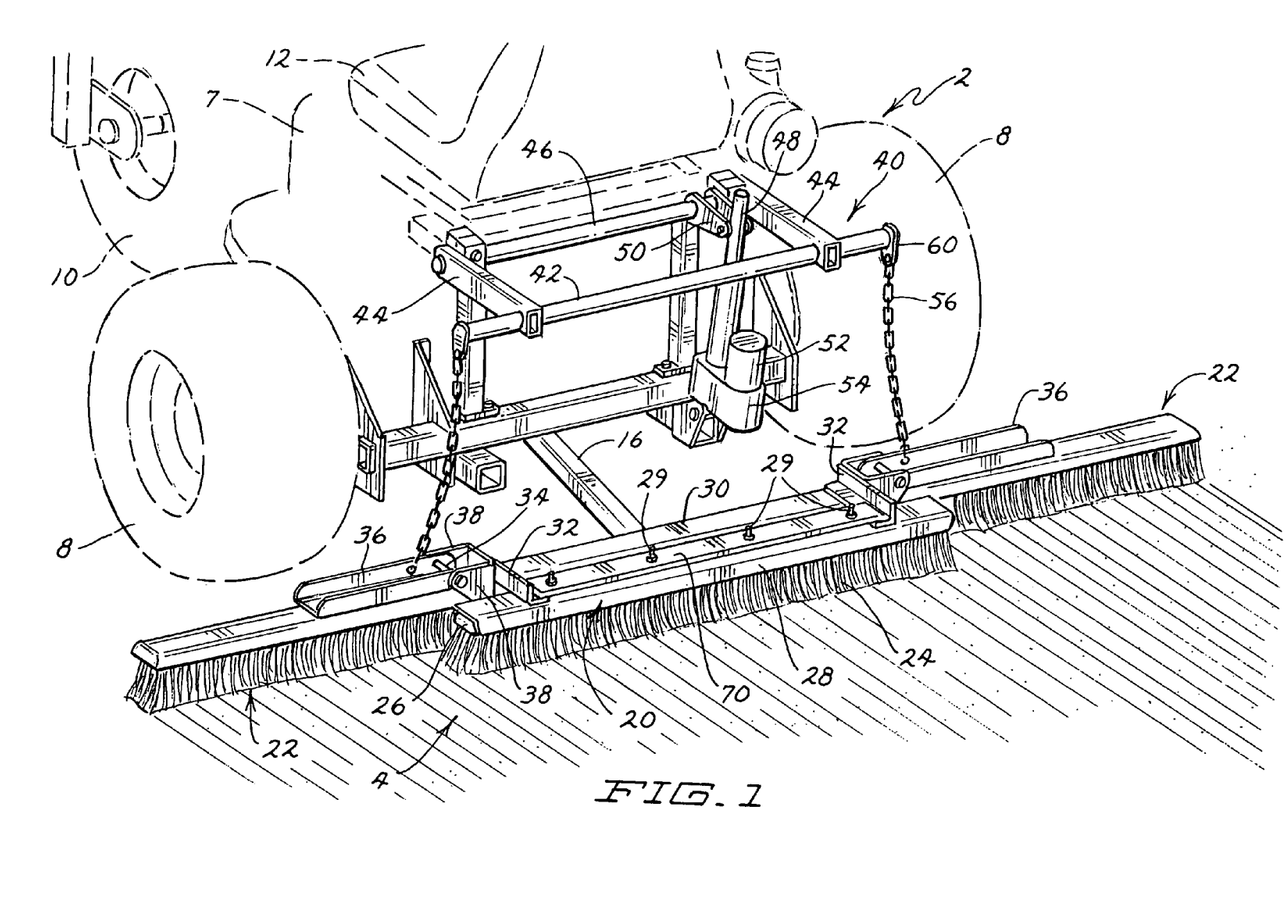
FIG. 1 is a perspective view of a ZRT sand grooming vehicle according to this invention, particularly illustrating a brush rake according to this invention attached to the rear of the vehicle and showing the brush rake in a lowered grooming position in contact with a sand surface.

FIG. 1 illustrates the rear of a sand grooming vehicle 2 according to this invention. FIG. 1 also illustrates a brush rake 4 according to this invention attached to the rear of vehicle 2. Brush rake 4 trails vehicle 2 and is towed by vehicle 2 to groom and smooth sand as vehicle 2 is driven over a sand surface, such as the surface of a sand trap or bunker on a golf course. As will be explained in more detail hereafter, vehicle 2 and brush rake 4 cooperate to allow a sand surface to be groomed without leaving any of the ungroomed teardrops on the sand surface that are typically left by a conventional sand grooming vehicle and trailing rake. Such an ungroomed teardrop is illustrated as 6 in FIG. 7.

Referring first to FIGS. 1–6, vehicle 2 of this invention comprises a Zero Radius Turn (ZRT) vehicle, also often referred to simply as a Z vehicle for short. Vehicle 2 has a frame 7 supported by three ground engaging wheels arranged in a tricycle configuration. The wheels include a pair of rear drive wheels 8 and a front caster wheel 10. Drive wheels 8 are independently powered and controlled so that one can be operated in a forward direction while the other is slowed, stopped or even operated in reverse. Operating one drive wheel 8 on one side of frame 7 forwardly while simultaneously slowing, stopping or reversing drive wheel 8 on the other side of frame 7 causes vehicle 2 to spin about its turning axis in a very sharp or substantially zero radius turn.

A seat 12 is provided on frame 7 of vehicle 2 for carrying a seated operator. Seat 12 is positioned generally between rear drive wheels 8. Twin control sticks 14 are provided with each stick 14 controlling one drive wheel 8. When sticks 14 are advanced together forwardly out of their neutral position, both drive wheels 8 are operated forwardly to cause vehicle 2 to move forwardly. Steering is accomplished by advancing one stick 14 more than the other. A zero radius turn can be achieved by advancing one stick 14 forwardly without advancing the other stick 14 or while pulling back on the other stick 14.

ZRT vehicles of the type utilized for vehicle 2 have long been used in rotary mowers. Thus, only a brief description of the principles of such a vehicle has been provided herein as one skilled in the art would understand how to build and operate such a ZRT vehicle. However, vehicle 2 of this invention is the first ZRT vehicle used as a sand grooming vehicle.

Brush rake 4 is attached to the rear of vehicle 2 by a hitch comprising a longitudinally extending tongue 16. A transversely extending pivot pin 18 pivotally connects the forward end of tongue 16 to vehicle 2. See FIG. 2A. Tongue 16 inclines downwardly as it extends rearwardly with the rear end of tongue 16 being rigidly connected to brush rake 4 fairly close to the bottom of brush rake 4. See FIG. 3. In normal operation of brush rake 4, the pivotal connection provided by pivot pin 18 allows brush rake 4 to pitch up and down as indicated by the arrows A and B in FIG. 3 to follow the contours of the sand surface. Alternatively, pivot pin 18 could comprise a ball joint to allow brush rake 4 to pitch, roll and yaw relative to vehicle 2 about three orthogonal x, y and z axes.

Brush rake 4 has three separate sections comprising a center brush 20 and two side brushes 22. Each brush 20 and 22 is similar in structure and comprises a well known push type shop brush having a lateral array of flexible bristles 24 joined to a brush head 26. Center brush 20 has its brush head 26 bolted to a downwardly facing, U-shaped channel 28 by a plurality of bolts 29.

Each side brush 22 is connected to one end of center brush 20 and extends laterally to one side of center brush 20, namely either to the left side or the right side of center brush 20. Side brushes 22 are parallel to center brush 20 and are positioned slightly forwardly of center brush 20. The laterally innermost ends of side brushes 22 are arranged to overlap the laterally outer ends of center brush 20 so that the three brushes together provide an unbroken grooming swath across the entire width of brush rake 4.

Brush rake 4 further includes a transverse support beam 30 that supports the three brushes 20 and 22. The rear end of tongue 16 is welded or otherwise fixed to the front face of support beam 30. Center brush 20 is fixed to support beam 30 by a pair of L-shaped attachment flanges 32 that extend from the top of support beam 30 to the top of the channel 28 that carries center brush 20 to join support beam 30 and center brush 20 together. Thus, center brush 20 and support beam 30 move together as a single unit.

Each side brush 22 is pivotally connected to each laterally outer end of support beam 30, and thus effectively to each laterally outer end of center brush 20, by a longitudinally extending pivot pin 34. In this regard, each side brush 22 has an upwardly facing, U-shaped channel 36 bolted by bolts 37 to the top of the side brush 22. See FIG. 5. Each channel 36 fits between a pair of ears 38 extending laterally outwardly from one attachment flange 32. The pivot connection is formed by passing the longitudinal pivot pin 34 through ears 38 and through the walls of channel 36 as shown in FIG. 1. Support beam 30 is somewhat shorter than center brush 20 to allow the previously described overlap between the laterally innermost ends of side brushes 22 and the laterally outer ends of center brush 20.

A brush lift 40 is provided on vehicle 2 for lowering and raising brush rake 4 into and out of engagement with the sand surface. Brush lift 40 comprises a transverse lift rod 42 positioned parallel to and generally above brush rake 4. See FIGS. 1 and 4. A pair of support arms 44 pivotally connect lift rod 42 to a transversely extending pivot shaft 46 journalled on vehicle 2. As pivot shaft 46 rotates on vehicle 2, arms 44 will raise and lower lift rod 42 depending upon the direction of rotation of pivot shaft 46.

As shown in FIG. 1, a linear actuator 48 is coupled to pivot shaft 46 a pair of connecting links 50. Thus, as linear actuator 48 extends upwardly, pivot shaft 46 is rotated in one direction and as linear actuator 48 retracts downwardly pivot shaft 46 is rotated in the opposite direction. An electric motor 52 drives linear actuator 48 through a gear reduction 54 for moving linear actuator 48 upwardly and downwardly. Motor 52 is controlled by the operator through a suitable switch (not shown) positioned adjacent the operator's seat 12. However, instead of using an electrically driven linear actuator 48, any other suitable device could be used to effect rotation of pivot shaft 46, e.g. a hydraulic cylinder, an electric motor directly coupled to pivot shaft 46, etc.

Lift rod 42 is coupled by a pair of flexible straps or chains 56 to side brushes 22. As shown in FIG. 1, each end of lift rod 42 has the upper end of a chain 56 affixed thereto by connecting the upper end of chain 56 to an attachment tab 60. The lower end of chain 56 connects to one of the side walls of channel 36 on top of a side brush 22. Normally, when brush rake 4 is in its lowered grooming position as shown in FIG. 1, chains 56 are slack. This allows side brushes 22 to pivot about longitudinal pivot pins 34 during a sand grooming operation to allow side brushes 22 to conform to the contours of the sand surface independently of center brush 20.

Figure 2A:
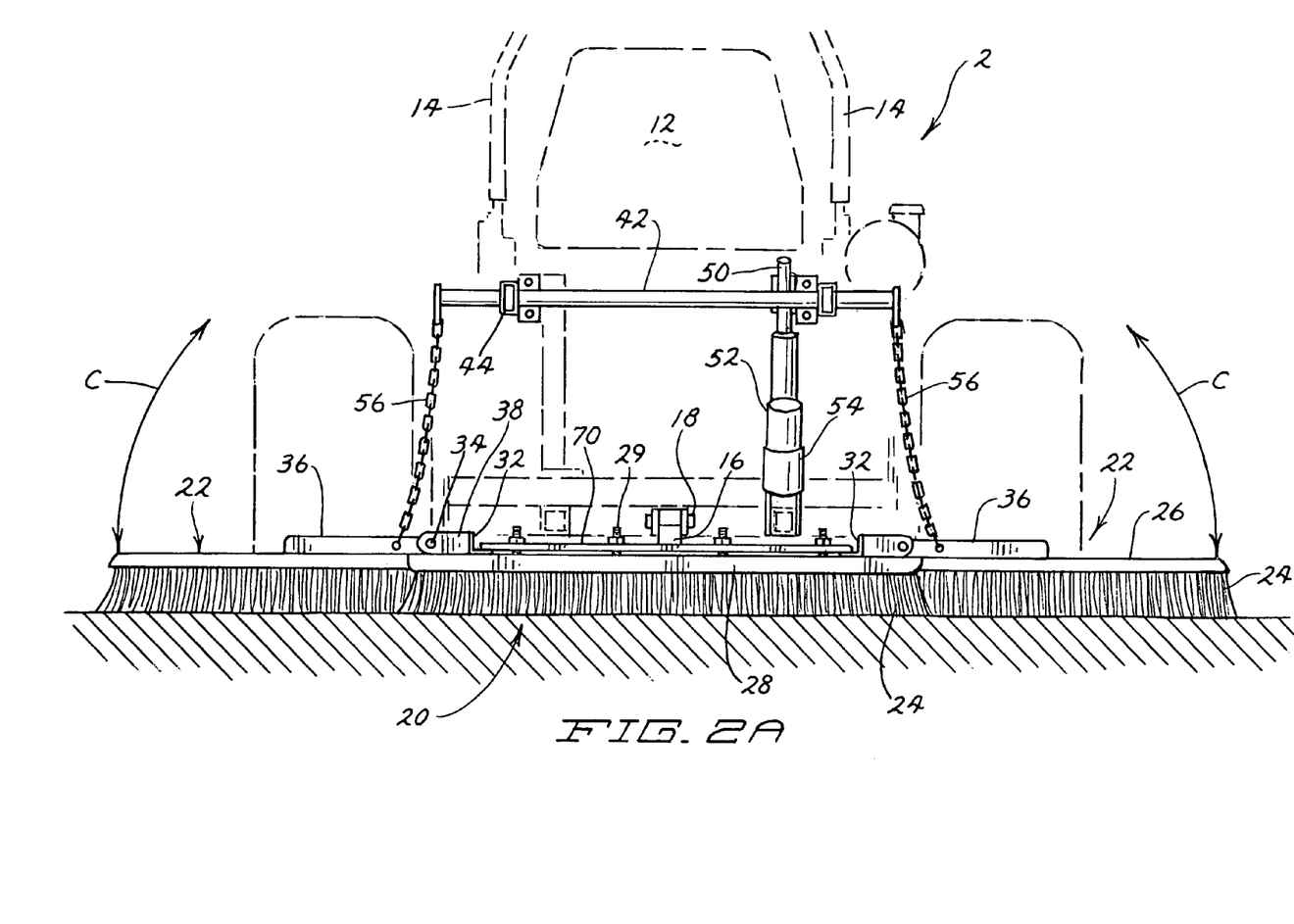
FIG. 2A is a rear elevational view of the vehicle shown in FIG. 1, particularly illustrating the brush rake in the lowered grooming position.
Figure 2B:
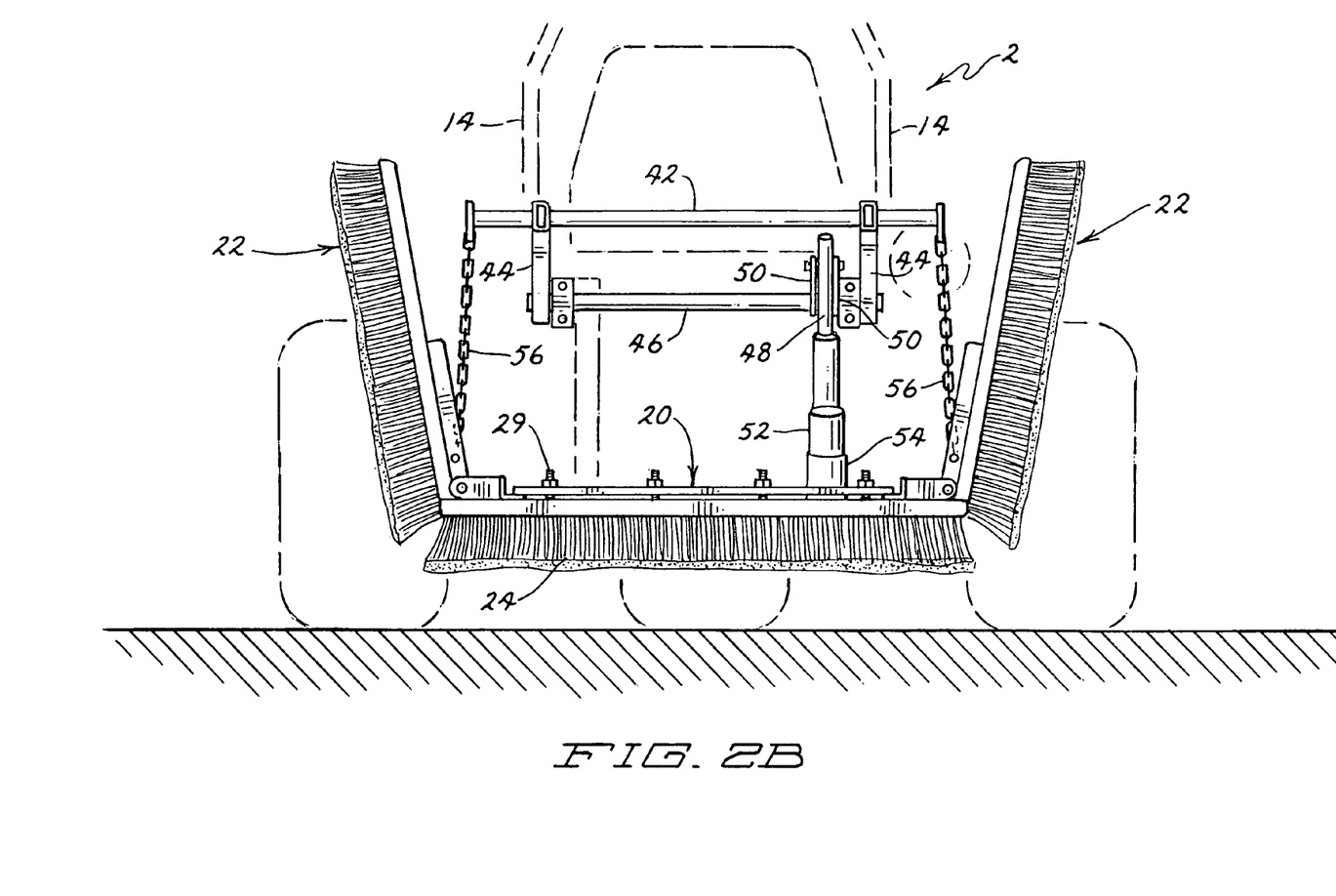
FIG. 2B is a rear elevational view of the vehicle shown in FIG. 1, particularly illustrating the brush rake in a raised transport position in which the brush rake is raised out of contact with the sand surface.
Figure 3:
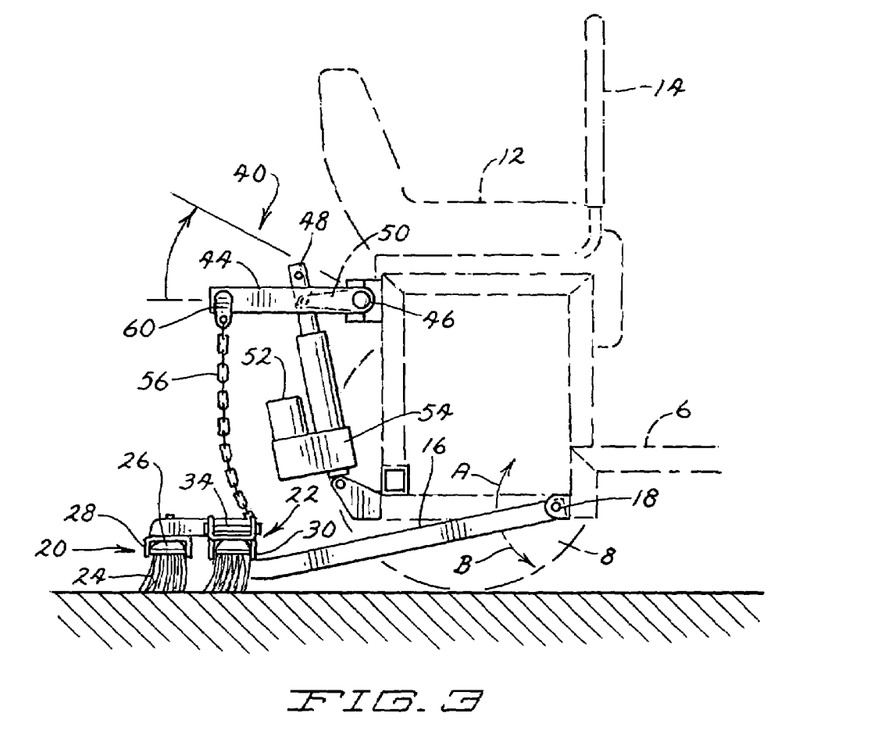
FIG. 3 is a side elevational view of the vehicle shown in FIG. 1, particularly illustrating the brush rake in the lowered grooming position.
Figure 4:
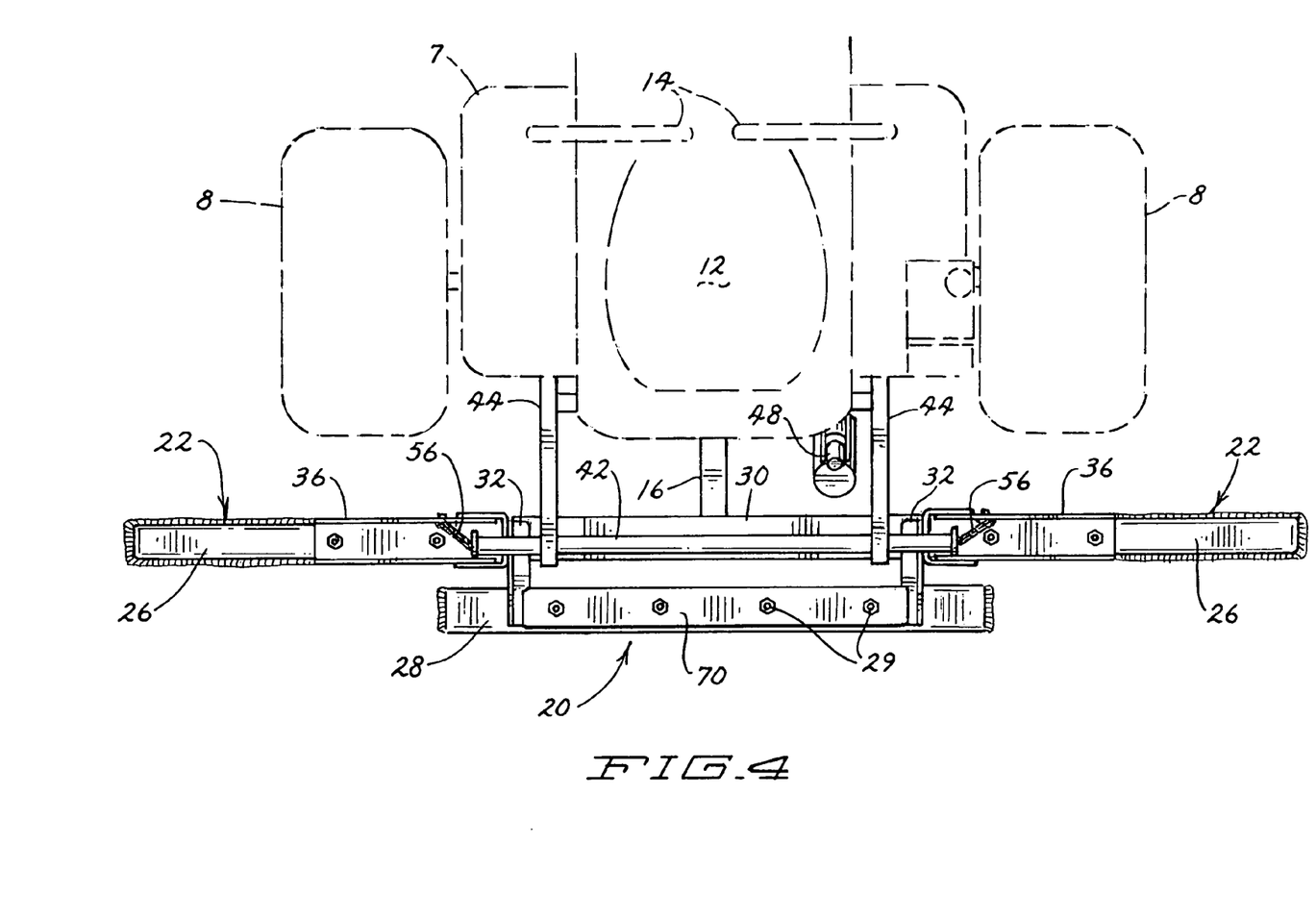
FIG. 4 is a top plan view of the vehicle and brush rake shown in FIG. 1.

When the operator desires to raise brush rake 4 from its lowered grooming position as shown in FIG. 1 to its raised transport position as shown in FIG. 2B, the operator simply actuates motor 42 to extend linear actuator 48 upwardly. This rotates pivot shaft 46 in the direction that causes lift rod 42 to move upwardly away from brush rake 4. As lift rod 42 moves upwardly, chains 56 will tighten and will cause side brushes 22 to pivot inwardly relative to center brush 20 as indicated by the arrows C in FIG. 2A. After side brushes 22 have folded inwardly, further upward movement of lift rod 42 will now pick up and lift the entire brush rake 4 by pivoting support beam 30 and tongue 16 relative to vehicle 2 about pivot pin 18. When linear actuator 48 has been fully extended, brush rake 4 will be held in a raised transport position off the sand surface as shown in FIG. 2B.

The process of lowering brush rake 4 into its lowered grooming position is simply the reverse of the process for raising brush rake 4. The operator simply reverses motor 52 to retract linear actuator 48, thus causing lift rod 42 to lower. Brush rake 4 pivots back down about pivot pin 18 until center brush 20 engages the sand surface. At this time, further lowering of lift rod 42 will permit side brushes 22 to pivot back down from their generally vertical, folded up positions shown in FIG. 3 into engagement with the sand surface. The final lowering movement of lift rod 42 will then allow chains 56 to become slack as is desired during a normal grooming operation.

Center brush 20 is preferably heavier than either of the side brushes 22. This is accomplished somewhat naturally since the weight of center brush 20 effectively includes the weight of support beam 30 to which it is attached. In addition, the channel 28 used to mount center brush 20 extends full length over center brush 20 and is longer, and thus heavier, than the channels 36 used to mount side brushes 22, which channels 36 extend over only a portion of the length of each side brush as shown in the drawings. To further increase the weight of center brush 20, one or more additional weights 70 could be placed on top of support beam 30 or on top of center brush 20.

Figure 7:
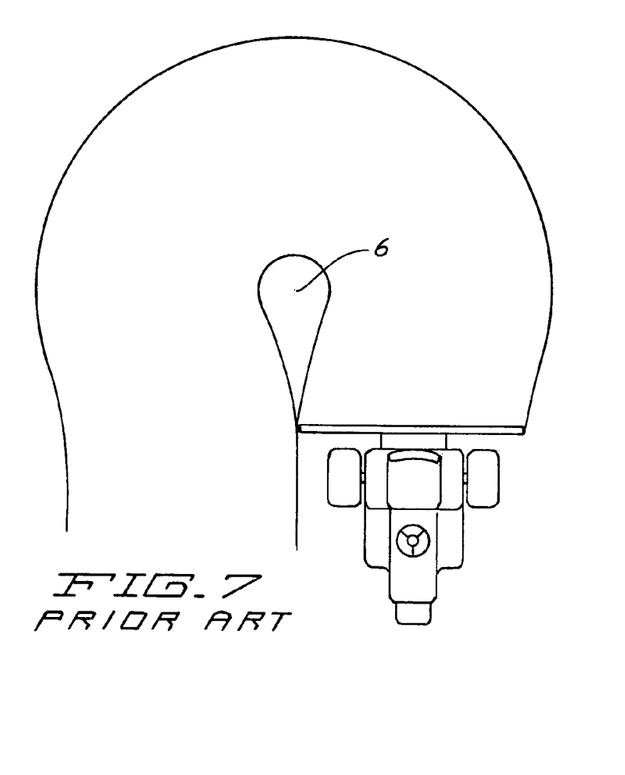
FIG. 7 is a diagrammatic top plan view of a prior art sand grooming vehicle and of the operation of the prior art vehicle, particularly illustrating the ungroomed teardrop left at the inside corner of a turn between the side-by-side grooming swaths formed by multiple grooming passes of the prior art vehicle and trailing rake.

Before discussing the operation of vehicle 2 or brush rake 4 of this invention, the operation of a typical prior art sand grooming vehicle and rake will be described in reference to FIG. 7. As set forth in the Background of the Invention section of this application, sand grooming vehicles as known in the prior art are not capable of zero radius turning operation. Thus, when turning in a sand trap or bunker to make another pass across the sand surface, there is a teardrop shaped portion on the inside corner of the turn that is left ungroomed. As noted earlier, FIG. 7 illustrates the teardrop so formed by a prior art sand grooming vehicle as 6.

Figure 5:
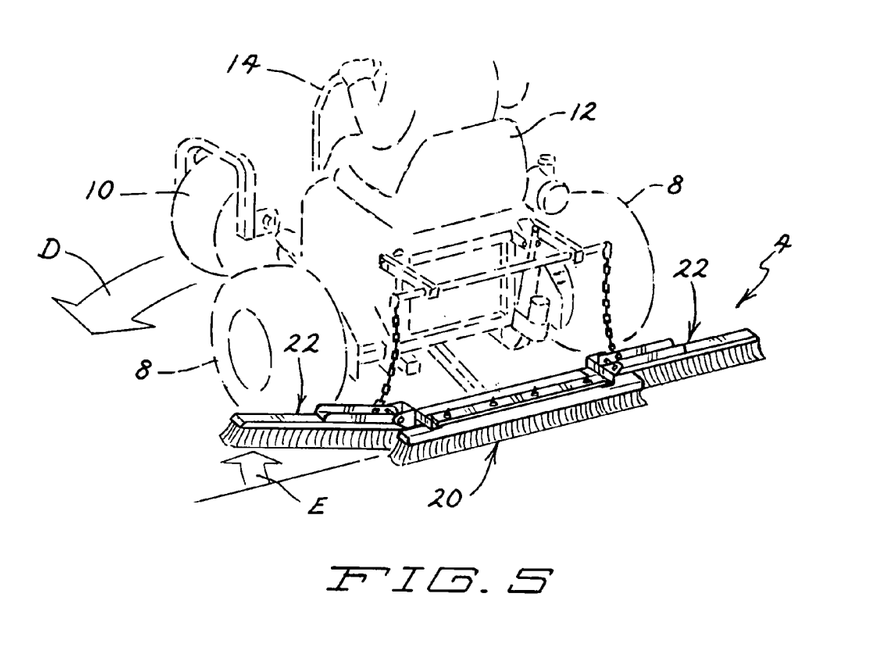
FIG. 5 is a perspective view of the vehicle shown in FIG. 1, particularly illustrating how the side brush on the inside of the turn lifts during the turn.
Figure 6:
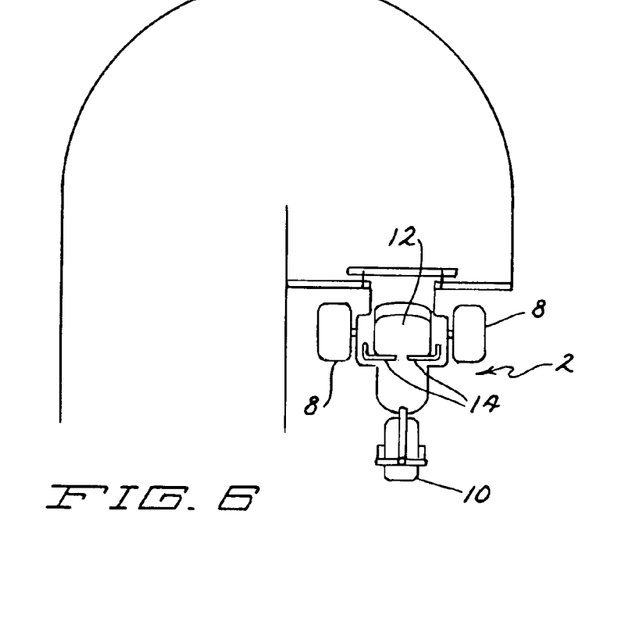
FIG. 6 is a diagrammatic top plan view of the operation of the vehicle shown in FIG. 1, particularly illustrating multiple grooming passes and the overlapped side-by-side grooming swaths left by the brush rake and vehicle of this invention following a turn of the vehicle.

Referring now to FIGS. 5 and 6, with sand grooming vehicle 2 of this invention, the operator can execute a spin turn with very little or zero radius through suitable manipulation of control sticks 14. In such a turn, the laterally outermost end of side brush 22 on the inside of the turn would move somewhat rearwardly relative to the center of the turn and would otherwise push a rather large ridge or line of sand behind the brush during the turn. As vehicle 2 completes the turn and drives forwardly, the teardrop would be eliminated due to the tightness of the turn. However, the ridge or line of sand created by side brush 22 on the inside corner of the turn would remain. Leaving such a ridge or line of sand on the groomed sand surface is objectionable.

This is where the pivotal connections of side brushes 22 relative to center brush 20 come into play. As shown in FIG. 5, during a tight spin type turn of vehicle 2, the forces acting on the side brush 22 on the inside of the turn, including the force of the sand on the bottom of the brush as the brush attempts to slide on the sand surface, will cause the side brush 22 on the inside of the turn to pivot or lift upwardly as shown. This is due to the placement of the pivot pin 34 for side brush 22 at the top of side brush 22 well above the plane of engagement of the brush bristles with the sand. The force of the sand on the brush bristles will have a component that causes upward pivoting of side brush 22 about the pivot pin 34. Referring to FIG. 5, the direction of the turn is indicated by the arrow D and the upward pivoting of the side brush 22 on the inside of the turn is indicated by the arrow E with the laterally outermost end of the side brush 22 on the inside of the turn shown raised above the sand surface.

The effect of raising the side brush 22 on the inside of the turn as shown in FIG. 5 is to greatly reduce or eliminate any sand from being pushed behind the brush during the turn. Thus, the operator can execute a spin steer as shown in FIG. 6 during a sand grooming operation and drive forwardly without leaving any teardrop in the grooming path. Moreover, the brush 22 on the inside of the turn does not leave any appreciable ridges or lines of sand in the grooming swath. Accordingly, the sand grooming vehicle and brush rake 4 of this invention can groom a sand surface in a sand trap or bunker without leaving any tear-drops even when making multiple side-by-side grooming passes. This is an advantage over the prior art.

In addition, even when vehicle 2 is simply driving forwardly and is not turning, the disclosed pivotal connections of side brushes 22 and the fact that side brushes 22 are relatively light compared to center brush 20 means that the laterally outer edges of each side brush will normally pivot up somewhat above the sand. Thus, the tendency of brush rake 4 to leave distinct edges or lines in the sand marking the outer edges of the grooming swath is reduced with a much smoother, line free swath being produced. This is also an advantage.

In addition to grooming a sand surface, vehicle 2 and brush rake 4 can also be used to groom and smooth other surfaces comprised of loose granular material. For example, such vehicles and rakes are also used to groom the loose dirt forming the infields of baseball diamonds. Thus, vehicle 2 and brush rake 4 are not limited for grooming sand, but can also groom surfaces made of other loose granular material.

Various modifications of this invention will be apparent to those skilled in the art. For example, brush rake 4 of this invention could be used in conjunction with non ZRT sand grooming vehicles of the type known in the prior art. The lifting of side brush 22 on the inside of the turn during a sharp turn will decrease the tendency of brush rake 4 to leave sand ridges even though teardrop 6 may not completely eliminated. Moreover, the relatively light, pivotal side brushes minimize lines or ridges in the sand along the laterally outer edges of a grooming swath even when vehicle 2 is not turning.

In addition, the ZRT sand grooming vehicle 2 of this invention could be used with other conventional rakes for grooming sand and need not be used only with brush rake 4. A ZRT sand grooming vehicle 2 can operate in smaller bunkers in which traditional sand grooming vehicles cannot be used due to the larger turning radii of such traditional vehicles. This avoids the need to hand rake smaller bunkers or sand traps since ZRT vehicle 2 can be operated in such smaller bunkers or sand traps. Accordingly, a ZRT sand grooming vehicle 2 as disclosed herein is useful regardless of the kind of rake that it tows.

In addition, the operator's seat 12 could be replaced with a platform (not shown) for supporting a standing operator between the rear wheels 8. Thus, the ZRT vehicle 2 of this invention could be provided in both sit down and stand on versions.

Accordingly, the scope of this invention is to be limited only by the appended claims.

We claim:

1. A brush rake for a grooming vehicle for smoothing loose, granular material, which comprises:
   (a) a center brush having a hitch for connecting to the vehicle such that the center brush can be towed behind the vehicle;
   (b) a pair of side brushes pivotally connected to the center brush by a pair of pivot connections with a first side brush being pivotally connected to one lateral outer end of the center brush and a second side brush being pivotally connected to an opposite lateral outer end of the center brush;

(c) wherein the center and side brushes have flexible brush bristles that are the only portion of the brush rake that engage the loose granular material;

(d) wherein the center brush is longitudinally offset relative to the side brushes such that the bristles of the center brush are not aligned end-to-end with and do not engage the bristles of the side brushes to permit the side brushes to pivot freely with respect to the center brush without any interference between the bristles of the center and side brushes;

(e) wherein the side brushes have laterally innermost ends that overlap the lateral outer ends of the center brush so that the center and side brushes groom an unbroken swath in a surface formed of loose granular material; and (f) wherein the pivot connections each comprise a longitudinal pivot pin that is fixed to one of the lateral outer ends of the center brush with at least a portion of the pivot pin being longitudinally extended relative to the center brush such that the longitudinally extended portion of the pivot pin is positioned substantially directly above the laterally innermost end of one of the side brushes to journal the side brush for pivoting relative to the center brush substantially at the laterally innermost end of the side brush, whereby a force acting on the bristles of the side brush tending to lift an outer end of the side brush will lift the outer end of the side brush without causing the laterally innermost end of the side brush to dig down into the loose granular material surface.

2. The brush rake of claim 1, wherein each side brush is pivotally connected to the center brush above a horizontal plane defined by the engagement of the brush bristles of each side brush and the loose granular material.

3. The brush rake of claim 1, wherein the center brush is operatively secured to a support beam, and wherein the side brushes are pivotally connected to the center brush by being pivotally connected to the support beam.

4. The brush rake of claim 3, wherein the center brush is rigidly connected to the support beam.

5. The brush rake of claim 4, wherein the support beam has a top, and wherein the center brush is rigidly connected to the support beam by at least one attachment member extending between and connected respectively to the top of the center brush and to the top of the support beam to rigidly fix the center brush and the support beam together.

6. The brush rake of claim 3, wherein the support beam is shorter than the center brush to permit laterally innermost ends of the side brushes to overlap the lateral outer ends of the center brush.

7. The brush rake of claim 1, wherein the center brush is heavier than either of the side brushes.

* * * * *